United States Patent
Wood et al.

(10) Patent No.: US 12,272,117 B1
(45) Date of Patent: Apr. 8, 2025

(54) SYSTEM AND METHOD FOR YATO/YANTO CLASSIFICATION

(71) Applicant: BAE SYSTEMS INFORMATION AND ELECTRONIC SYSTEMS INTEGRATION INC., Nashua, NH (US)

(72) Inventors: Benjamin P. Wood, Bedford, MA (US); Jeffrey A. Wallace, Nashua, NH (US); Jacob Branchaud, Londonberry, NH (US); Marc J. Fredette, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 602 days.

(21) Appl. No.: 17/725,149

(22) Filed: Apr. 20, 2022

(51) Int. Cl.
*G06V 10/764* (2022.01)
*G06V 10/70* (2022.01)

(52) U.S. Cl.
CPC .......... *G06V 10/764* (2022.01); *G06V 10/768* (2022.01)

(58) Field of Classification Search
CPC .......................... G06V 10/764; G06V 10/768
See application file for complete search history.

(56) References Cited

U.S. PATENT DOCUMENTS

| | | | |
|---|---|---|---|
| 6,995,660 | B2 | 2/2006 | Yannone et al. |
| 7,654,185 | B1 | 2/2010 | Yannone |
| 10,054,445 | B2 | 8/2018 | Ma |
| 11,126,897 | B2 | 9/2021 | Cai et al. |
| 2015/0285906 | A1 | 10/2015 | Tooper et al. |
| 2016/0277646 | A1* | 9/2016 | Carr ..................... G06T 7/277 |
| 2019/0180090 | A1* | 6/2019 | Jiang .................. G06V 10/454 |
| 2020/0134852 | A1 | 4/2020 | Mercier |

FOREIGN PATENT DOCUMENTS

EP 3467545 10/2019

\* cited by examiner

*Primary Examiner* — Mekonen T Bekele
(74) *Attorney, Agent, or Firm* — Sand, Sebolt & Wernow LPA

(57) ABSTRACT

A passive sensor is used in conjunction with a trained machine learning classifier to make a You Are The One/You Are Not The One (YATO/YANTO) classification or determination as to whether an object, such as a threat, is moving toward a platform. The trained machine learning classifier utilizes a feature vector generated from conditioned temporal data and angular data obtained from passive sensor carried by the platform.

19 Claims, 3 Drawing Sheets

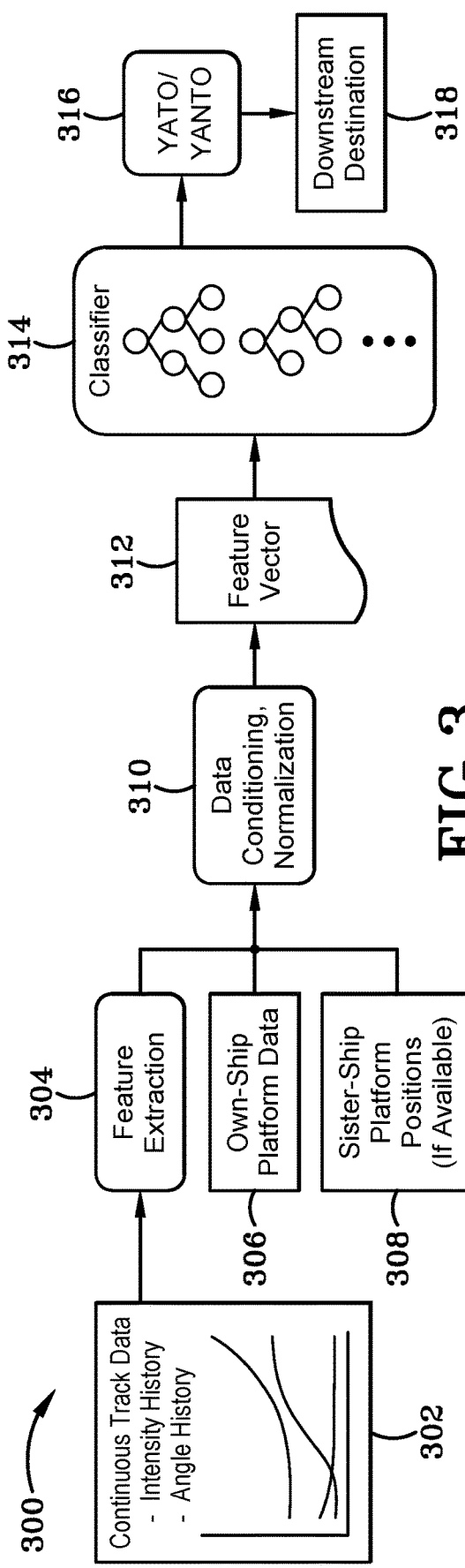
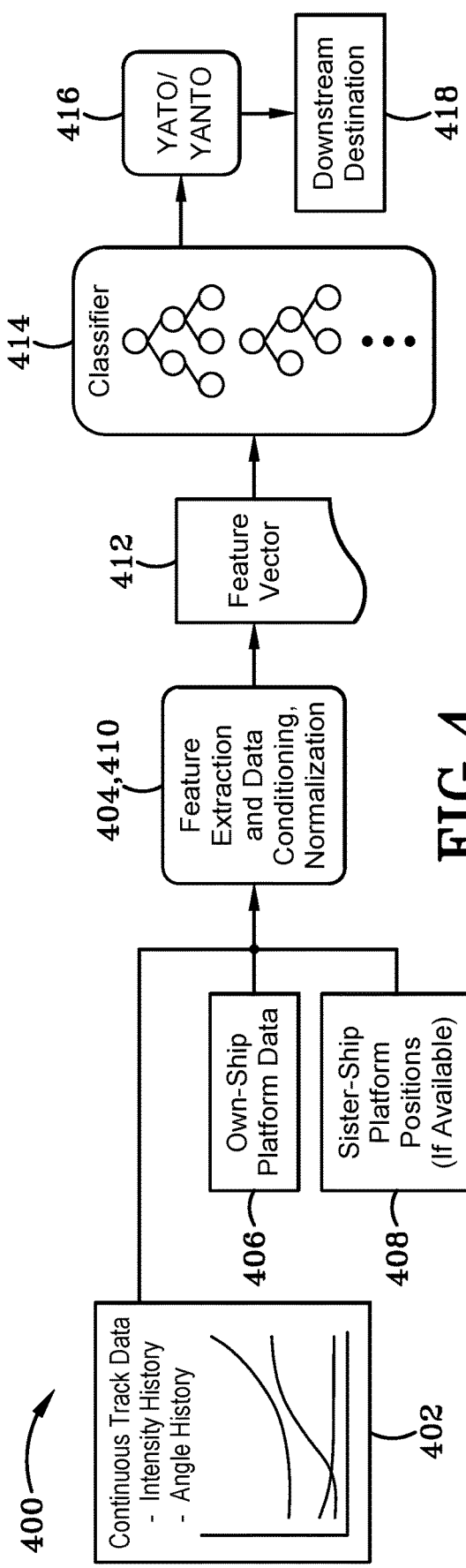
FIG.3
FIG.4

SYSTEM AND METHOD FOR YATO/YANTO CLASSIFICATION

TECHNICAL FIELD

The present disclosure relates generally to machine learned classification techniques. More particularly, the present disclosure relates to machine learned classification techniques based on feature vectors obtained from one or more passive sensors carried by a platform.

BACKGROUND

When a platform is moving, it should have the intelligence capabilities to discriminate and determine that objects are moving near the platform. These capabilities should include a capability to determine whether the object is moving toward the platform or in another direction that is of no consequence to the platform. Currently, active sensors, such as Light Detection and Ranging (LIDAR) and radar, are utilized to assist in the determination of whether an object is moving towards the platform.

In addition to the active sensors on the platform, the platform often carries passive sensors as well. Optical sensors or optical imagers are one exemplary type of passive sensor on the platform that capture imagery that is used for surveillance and other object recognition techniques.

It is also known that when there are other platforms in the vicinity (such as two aircraft flying in formation), both platforms each need to detect objects, such as threats, that are incoming. However, because of the relatively close but adjacent spacing of two platforms flying in formation, this can be difficult because objects at a sufficient distance may appear to be targeting both platforms based on their close proximity relative to the distant object.

SUMMARY

To address these problems discussed above, the system and method of the present disclosure enables the platform to determine whether an object is moving towards a platform utilizing one or more passive sensors, instead of using active sensors. This will assist with a subsequent determination that if the object is moving towards the platform and is a threat, then evasive techniques or countermeasures may be applied or deployed. In another example, the present disclosure enables a platform or a processor on the platform to make the determination that the platform is the one ("you are the one"-YATO) or is not the one ("you are not the one"-YANTO) toward which the object, such as a threat, is approaching or otherwise targeting. More particularly, the present disclosure uses a machine learned classifier to make the determination (i.e., classifies) whether the platform is the one (YATO) or is not the one (YANTO) toward which an object, such as a threat, is approaching or otherwise targeting.

One or more passive sensors on the platform detect and track the candidate object that is potentially moving toward the platform. During movement of the object toward the platform, passive sensors on the platform collect data or information from the track of the moving object that are utilized, as further detailed herein, to make the YATO/YANTO decision or classification.

Features are extracted from the track data of the candidate object. The extracted features are fed into a classifier (i.e., machine learned and pre-trained classification logic), which will be trained to classify whether the behavior of the candidate object (such as a projectile or self-guided missile) is approaching the platform so that the classifier will make a machine-based decision or classification as to whether the platform is YATO/YANTO with respect to which the object has targeted. More particularly, the characteristics or values of a feature vector are classified by the classifier to determine whether there is an indication that the candidate object is moving towards the platform or in another direction not towards the platform. Previous techniques proved difficult for detecting an incoming object or threat towards a platform especially when the separation between platforms is small compared to the distance from the threat. Take for example when two aircrafts or platforms are flying in formation and only spaced apart by a relatively short distance compared to the distance to the threat. When an object or projectile, such as a threat, is fired at one of the platforms, the behavior of the object relative to the platforms will look similar due to the relatively close spacing between the two platforms. To solve this problem, the present disclosure enables the platforms to determine the difference between which platform is the target or which platform is not the target at smaller intervals or an earlier time in the engagement. The machine learning techniques associated with the classifier enable an increase in discriminatory power that a system has to determine whether an incoming candidate object is approaching a platform.

In one aspect, an exemplary embodiment of the present disclosure may provide a method comprising: tracking an object that is moving via a passive sensor on a platform; obtaining temporal data and angular data of the object relative to the platform via the passive sensor; tabulating the temporal data and angular data of the object over a period of time; extracting features from the temporal data and angular data of the object; generating a feature vector from the features that were conditioned and normalized; providing the feature vector to a machine learned classifier; and determining, via the machine learned classifier analyzing the feature vector, whether the platform is the one or is not the one (YATO/YANTO) that the object is moving toward. This exemplary embodiment or another exemplary embodiment may further provide wherein tabulating the temporal data and angular data occurs continuously over the period of time. This exemplary embodiment or another exemplary embodiment may further provide associating the object in an image with previous image frames to generate a track of the object. This exemplary embodiment or another exemplary embodiment may further provide summing intensities of the pixels from a focal plane array that have sensed the object. This exemplary embodiment or another exemplary embodiment may further provide maintaining summed intensities of the pixels for a period of time for the track. This exemplary embodiment or another exemplary embodiment may further provide filtering the image to remove the background data relative to object in the image. This exemplary embodiment or another exemplary embodiment may further provide curve fitting the features extracted from the temporal data and angular data of the object. This exemplary embodiment or another exemplary embodiment may further provide deriving a set of derived data from curve fit extracted features of the temporal data and angular data. This exemplary embodiment or another exemplary embodiment may further provide accounting for data from other sensors on the platform; accounting for data from a remote platform; and conditioning and normalizing the data accounted for from other sensors on the platform and the data accounted for from the remote platform with the features extracted from the temporal data and angular data of the object. This exemplary embodiment or another exemplary embodiment may further provide generating the feature vector in a format that corresponds with that which the classifier has been trained. This exemplary embodiment or another exemplary embodiment may further provide generating the feature vector to provide data representing initial azimuth relative to the object, initial elevation relative to the object, change in azimuth relative to the object, change in elevation relative to the object, intensity curve fit coefficients, platform altitude, and platform airspeed. This exemplary embodiment or another exemplary embodiment may further provide wherein the machine learned classifier utilizes decision tree architecture. This exemplary embodiment or another exemplary embodiment may further provide wherein the machine learned classifier is trained prior to being provided with the feature vector. This exemplary embodiment or another exemplary embodiment may further provide providing a YATO/YANTO determination, classification, or decision to a subsequent device or logic that makes a subsequent determination of how to utilize the YATO/YANTO determination, classification or decision.

In another aspect, an exemplary embodiment of the present disclosure may provide an object classification system comprising: a platform; a passive sensor carried by the platform, wherein the passive sensor is configured to track a moving object; temporal data logic configured to process temporal data associated with the moving object; spatial data logic configured to process spatial data associated with the moving object; classification logic configured to classify, based on the temporal data and the spatial data, whether the platform is the one or is not the one (YATO/YANTO) that the moving object is moving toward, wherein the classification logic includes a trained machine learned classifier. This exemplary embodiment or another exemplary embodiment may further provide logic to tabulate the temporal data and angular data of the moving object over a period of time. This exemplary embodiment or another exemplary embodiment may further provide logic to extract features from the tabulated temporal data and angular data of the moving object. This exemplary embodiment or another exemplary embodiment may further provide logic to condition and normalize the features extracted from the temporal data and angular data of the moving object. This exemplary embodiment or another exemplary embodiment may further provide logic to generate a feature vector from the features that were conditioned and normalized. This exemplary embodiment or another exemplary embodiment may further provide wherein the feature vector includes initial azimuth relative to the moving object, initial elevation relative to the moving object, change in azimuth relative to the moving object, change in elevation relative to the moving object, intensity curve fit coefficients, platform altitude, and platform airspeed. This exemplary embodiment or another exemplary embodiment may further include instructions for the platform to perform an evasive technique or deploy a countermeasure in response to the trained machine learned classifier having classified the moving object as moving toward the platform and the platform considered YATO.

In yet another aspect, another exemplary embodiment of the present disclosure may provide a method comprising: effecting an object that is moving to be tracked via a passive sensor on a platform; effecting temporal data and angular data of the object relative to the platform to be obtained via the passive sensor; effecting the temporal data and angular data of the object to be tabulated over a period of time; effecting features to be extracted from the temporal data and angular data of the object; effecting the features extracted from the temporal data and angular data of the object to be conditioned and normalized; effecting a feature vector to be generated from the features that were conditioned and normalized; effecting the feature vector to be provided to a machine learned classifier; and effecting, via the machine learned classifier analyzing the feature vector, a determination of whether the platform is the one or is not the one (YATO/YANTO) that the object is moving toward. This exemplary embodiment may further provide effecting the object in an image to be associated with previous image frames to generate a track of the object. This exemplary embodiment may further provide effecting intensities of the pixels from a focal plane array that have sensed the object to be summed. This exemplary embodiment may further provide effecting summed intensities of the pixels for a period of time for the track to be maintained. This exemplary embodiment may further provide effecting the image to be filtered to remove the background data relative to object in the image. This exemplary embodiment may further provide effecting the features extracted from the temporal data and angular data of the object to be curve fit. This exemplary embodiment may further provide effecting a set of derived data to be derived from curve fit extracted features of the temporal data and angular data. This exemplary embodiment may further provide effecting a YATO/YANTO determination to be provided to a subsequent device or logic that makes a subsequent determination of how to utilize the YATO/YANTO determination.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 3 is a flow chart depicting an exemplary method according to various exemplary aspects of the YATO/YANTO determination technique of the present disclosure.

FIG. 4 is a flow chart depicting an exemplary method according to various exemplary aspects of the YATO/YANTO determination technique of the present disclosure.

Similar numbers refer to similar parts throughout the drawings.

DETAILED DESCRIPTION

Figure 1:
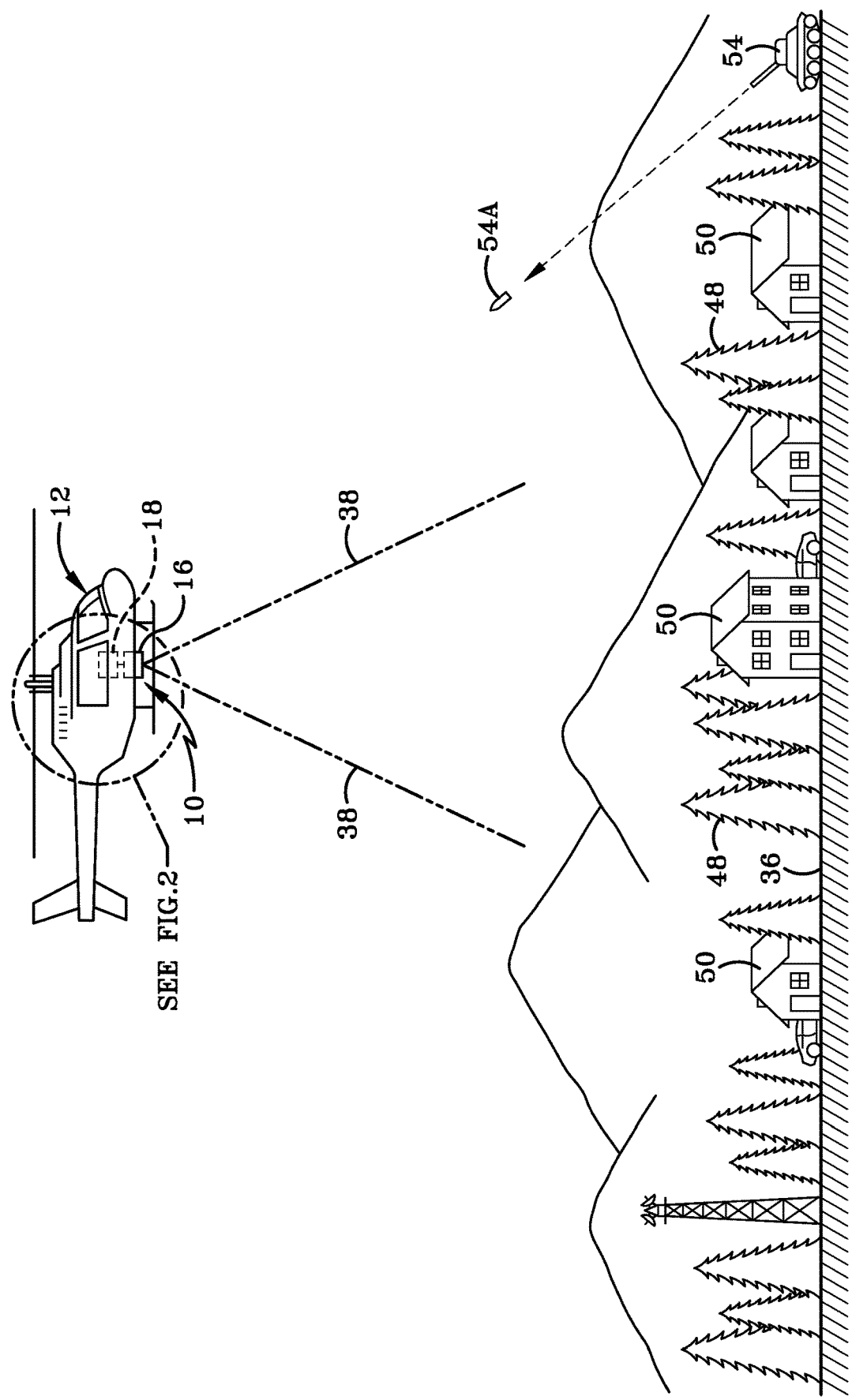
FIG. 1 is a diagrammatic view of a platform carrying an exemplary object classification system of that implements a YATO/YANTO determination technique of the present disclosure while traveling over an environment in which a field of view from at least one passive sensor is directed towards a geographic landscape.

FIG. 1 diagrammatically depicts an object classification system for a YATO/YANTO ("you are the one"/"you are not the one") determination technique in accordance with certain aspects of the present disclosure and is shown generally at 10. The object classification system 10 is operably engaged with a platform 12 and includes at least one image sensor 16, at least one processor 18, temporal data logic 20, spatial data logic 22, classification logic 24, and registration logic 26.

In accordance with one aspect of the present disclosure, the platform 12 may be any moveable platform configured to be elevated relative to a geographic landscape 36. Some exemplary moveable platforms 12 include, but are not limited to, unmanned aerial vehicles (UAVs), manned aerial vehicles, projectiles, guided projectiles, or any other suitable moveable platforms.

When the platform 12 is embodied as a moveable aerial vehicle, the platform 12 may include a front end or a nose opposite a rear end or tail. Portions of the object classification system 10 may be mounted to the body, the fuselage, or internal thereto between the nose and tail of the platform 12. While FIG. 1 depicts that some portions of the object classification system 10 are mounted or carried by the platform 12 adjacent a lower side of the platform 12, it is to be understood that the positioning of some components may be varied and the figure is not intended to be limiting with respect to the location of where the components of the system 10 are provided. For example, and not meant as a limitation, the at least one sensor 16 is mounted on the platform 12. Furthermore, some aspects of the at least one sensor 16 may be conformal to the outer surface of the platform 12 while other aspects of the at least one sensor 16 may extend outwardly from the outer surface of the platform 12 and other aspects of the at least one sensor 16 may be internal to the platform 12.

The at least one sensor 16 may be a passive sensor. One exemplary passive sensor is an optical sensor mounted on the lower side of the platform 12. The at least one sensor 16 is configured to observe scenes remote from the platform 12, such as, for example, a geographic landscape 36 within its field of view (FOV) 38. Inasmuch as the at least one sensor 16 has a FOV 38, and in one example, the at least one sensor 16 is an image sensor or imager. Further, when the at least one sensor 16 is embodied as an imager, the imager may be any imager capable of imaging terrain, such as, for example, a visible light imager, infrared (IR), a near-infrared imager, a mid-infrared imager, a far-infrared imager, or any other suitable imager. In one example, the imager has a frame rate of at least 100 frames per second. In another example, the imager has a frame rate of at least 500 frames per second. In yet another example, the imager has a frame rate between approximately 500 frames per second and approximately 1,000 frames per second. Although certain frame rates of the imager have been described, it is to be understood that the imager may have any suitable frame rate. For example, a frame rate of 10 Hz would also be acceptable.

The at least one sensor 16, which may be an IR imager, being a passive sensor 16 or imager refers to the at least one sensor 16 or the imager configured to view/receives data observed through its FOV 38 of the scene that is being observed, but does not actively produce or generate a source of energy that propagates outward from the sensor to thereafter obtain a received signal (such as that would be common with an active sensor, such as LIDAR or radar).

Sensor 16 may be one of many sensors on platform 12, such as a plurality of IR sensors or IR imagers, each including at least one focal plane array (FPA). Each FPA comprises a plurality of pixels. The IR sensors are able to detect spectral wavelengths. In this present disclosure, the IR sensors are capable of detecting multiple wavelengths in the visible and/or nonvisible spectrum of light.

The data or information from pixels that form one image have a spatial orientation relative to other pixels. Adjacent pixels in an image typically have shared or common information to an adjacent pixel in the overall image. The use of spatial data as referred to herein, refers to spatial data in the image. Thus, the present disclosure uses information in an image near a particular pixel to generate a YATO/YANTO classification, decision, or determination of a candidate object at that pixel.

Furthermore, when the at least one sensor 16 is embodied as an imager, the imager will have some components that are common to image sensors such as lens, domes, focal plane arrays, and may additionally include processors such as a Graphical Processing Unit (GPU), which may be an exemplary processor 18, and associated processing hardware. Towards that end, a reader of the present disclosure will understand that the at least one sensor 16 may include standard imaging components adapted to sense, capture, and detect imagery within its FOV 38. The imagery may be in a spectrum that is not viewable to the human eye, such as, for example, near-infrared imagery, mid-infrared imagery, and far-infrared imagery. However, one particular embodiment of the present disclosure utilizes IR imagery.

While the FOV 38 in FIG. 1 is directed vertically downward towards the geographic landscape 36, it is further possible for a system in accordance with the present disclosure to have a sensor 16 that projects its FOV 38 outwardly and forwardly from the nose of the platform 12 or outwardly and rearward from the tail of the platform 12, or in any other suitable direction. However, as will be described in greater detail below, certain implementations and embodiments of the present disclosure are purposely aimed downward so as to capture a scene image from the geographic landscape 36 to be used to provide navigation and/or position and/or location and/or geolocation information to the platform 12.

Generally, the sensor 16 has an input and an output. An input to the sensor 16 may be considered the scene image observed by the FOV 38 that is processed through the imagery or sensing components within the sensor 16. An output of the sensor may be an image captured by the sensor 16 that is output to another hardware component or processing component.

Figure 2:
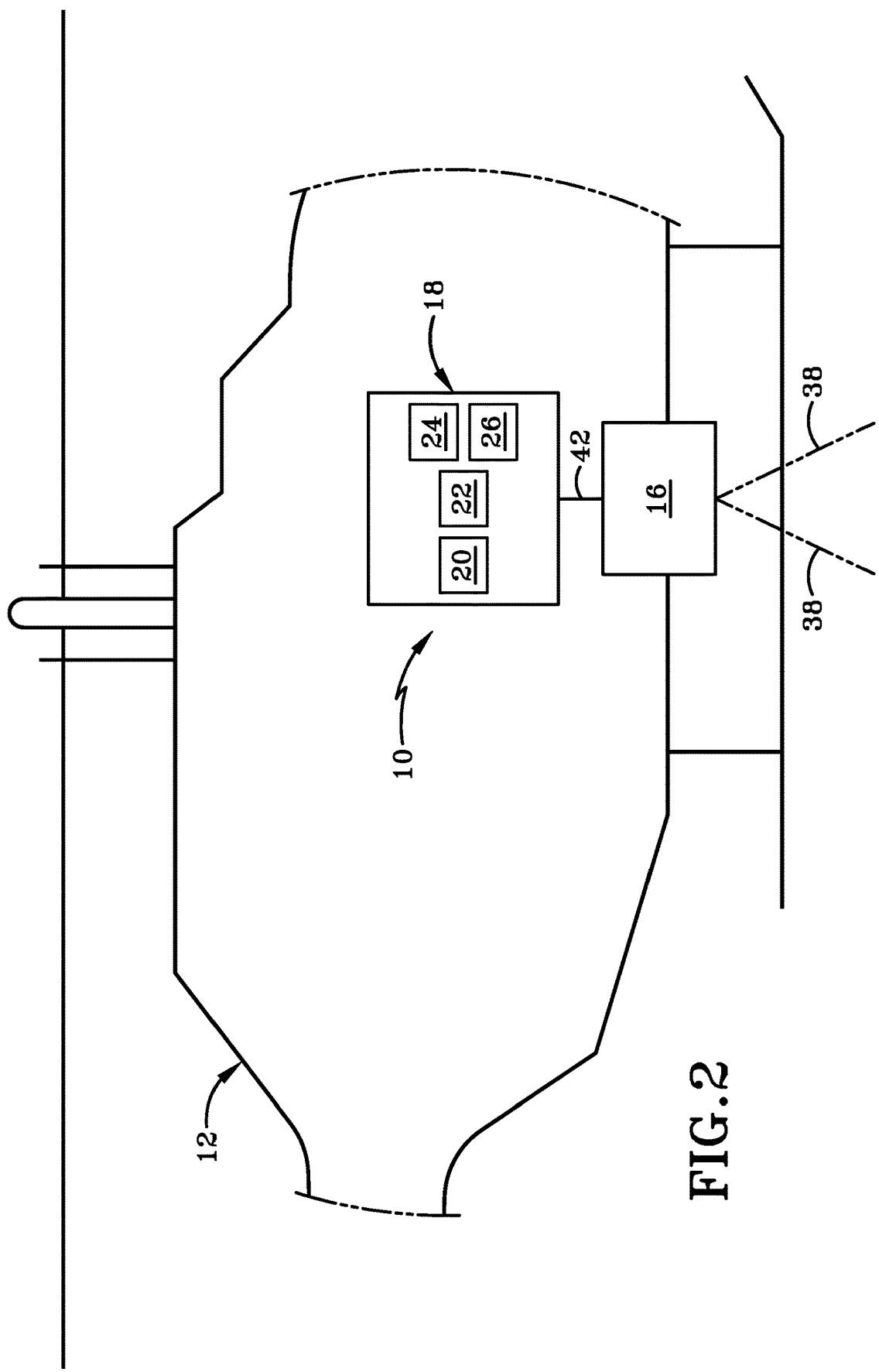
FIG. 2 is an enlarged schematic view of a portion of the platform carrying the object classification system as highlighted by the dashed circle labeled "SEE FIG. 2" from FIG. 1

FIG. 2 depicts the at least one processor 18 is in operative communication with the at least one sensor 16. More particularly, the at least one processor 18 is electrically connected with the output of the sensor 16. In one example, the at least one processor 18 is integrally formed within sensor 16. In another example, the processor 18 is directly wired the output of the sensor 16. However, it is equally possible for the at least one processor 18 to be wirelessly connected to the sensor 16. Stated otherwise, a link 42 electrically connects the sensor 16 to the at least one processor 18 (which may be entirely physically internal to the housing associated with sensor 16) and may be any wireless or wired connection, integral to the sensor 16 or external to sensor 16, to effectuate the transfer of digital information or data from the sensor 16 to the at least one processor 18. The at least one processor 18 is configured to or is operative to generate a signal in response to the data received over the link 42 from the sensor 16.

In accordance with one aspect of the present disclosure, the processor 18 may be a GPU that is performing the processing functionality to detect the YATO/YANTO object classification technique described herein, which may be a portion of a threat warning or countermeasure method or process. The GPU may be located on the platform or it may be located at a remote location separated from the platform, wherein when the GPU is at a remote location wireless signal transmission logic would be present on the platform to send the signal data to a receiver that feeds the signal data to the GPU for processing.

In some implementations, the data that is sent over the link 42 are scene images or video streams composed of sequential frames captured by the sensor 16 that is observing the geographic landscape 36 below through its FOV 38. As will be described in greater detail below, the at least one processor 18 may include various logics, such as, for example, temporal data logic 20, spatial data logic 22, classifier logic 24, and registration logic 26, which performs functions described in greater detail below.

With continued reference to FIG. 1, and having thus described the general structure of system 10, reference is now made to features of the geographic landscape 36. For example, and not meant as a limitation, the geographic landscape 36 may include natural features 48, such as trees, vegetation, or mountains, or manmade features 50, such as buildings, roads, or bridges, etc., which are viewable from the platform 12 through the FOV 38 of the sensor 16. Also within the FOV 38 is a candidate object 54, which may be a threat or another object of interest. System 10 is configured to classify and determine whether the candidate object is moving toward the platform. Namely, the system classifies whether the platform 12 "is the one" (i.e., you are the one-YATO) or is not the one (i.e., you are not the one-YANTO) that the object 54 or a projectile 54A fired from the object 54 is moving toward (wherein the projectile 54A can considered one type of object 54).

The system 10 uses the sensor 16 to capture a scene image from a scene remotely from the platform 12 and the at least one processor 18 generates a signal in response to the sensor 16 capturing the scene image. Metadata may be provided for each captured scene image. For example, and not meant as a limitation, the metadata may include a frame number of the scene image within a flight data set, a latitude position of the platform 12 in radians, a longitude position of the platform 12 in radians, an altitude position of the platform 12 in meters, a velocity of the platform 12 in meters per second, and a rotation of the platform 12 in degrees. Metadata associated with the at least one sensor 16 may also be provided, such, as, for example, mounting information related to the at least one sensor 16. Although examples of metadata have been provided, it is to be understood that the metadata may include any suitable data and/or information.

Temporal data logic 20 includes at least one non-transitory computer readable storage medium having instructions encoded thereon that, when executed by the at least one processor 18, implements operations to obtain a single band or multiple bands (i.e. multichannel-different parts of the infrared spectrum) of image data at a certain time that depicts object 54 or projectile 54A that are captured together in an image or in a frame of a video stream from the sensor 16.

Spatial data logic 22 includes at least one non-transitory computer readable storage medium having instructions encoded thereon that, when executed by the at least one processor 18, implements operations to determine the spatial locality or spatial position of a candidate object 54 or projectile 54A relative to a pixel on the focal plane array within image data from an image or from a frame of a video stream from the sensor 16.

Classifier logic 24 includes at least one non-transitory computer readable storage medium having instructions encoded thereon that, when executed by the at least one processor 18, implements operations to perform machine learned classification techniques to yield a YATO/YANTO classification, decision, or determination as to whether object 54 or projectile 54A is moving toward platform 12 based on a review of information obtained from sensor 16.

The registration logic 26 may include at least one non-transitory computer readable storage medium having instructions encoded thereon that, when executed by the at least one processor 18, implements operations to register the YATO/YANTO classification, decision, or determination.

The system of the present disclosure utilizes spatial data and temporal data to conduct a machine learned classification technique that has been stored in a memory and contain instructions that are executed by processor 18. Thus, the classifier logic 24 may be a machine-learned logic configured to be trained to classify whether the object 54 or projectile 54A fired from object 54 is moving towards platform 12, such that if the object 54 or a projectile 54A fired from object 54 is moving toward platform 12, then the machine learned classifier logic 24 provides a YATO classification and if the object 54 or a projectile 54A fired from object 54 is not moving towards platform 12, then the machine learned classifier logic 24 provides a YANTO classification. During the classification sequence, as discussed in greater detail herein, the last value of a pixel assists to understand the background that the system should expect or predict to see in the next time or sequential image at that pixel or an adjacent pixel. Likewise, the temporal information (especially when there are multiple different wavelengths) at the same pixel is utilized to assist to understand the background that the system should expect or predict to see in the next time or sequential image at that pixel or an adjacent pixel. The temporal information is created by tracking and extracting features over time from frame-to-frame.

After the machine learning YATO/YANTO classification, decision, or determination technique has been performed in the CPU/GPU processor 18, the output may be a YATO/YANTO determination signal. Then, the YATO/YANTO determination signal may be fed to the downstream or subsequent techniques of the threat warning system or a countermeasure system for higher discriminatory processing to perform an evasive or defensive action if the YATO/YANTO determination signal was determined to be a threat to the platform 12.

Additionally, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Having thus described the components of the system that implement the clutter suppression techniques, protocols, process, or methods detailed herein, reference is now made to its operation and the algorithmic operations that accomplish said operation of the YATO/YANTO object classification system 10.

As depicted in FIG. 3, an exemplary method for YATO/YANTO classification with for system 10 is shown generally at 300. A step provides for the continuous tracking of data, such as the intensity history and the angle history of the detected object 54 or projectile 54A, which is shown generally at 302. The continuous tracking of the object 54 or projectile 54A is accomplished by the image sensor 16 utilizing logic 20 and logic 22. In one particular embodiment, the image sensor 16 is the only sensor that is needed to continuously track the data of the approaching object 54 or projectile 54A. However, it is possible for the system to incorporate track data or continuous track data from other sensors carried by the platform 12. The sensor 16 tracks the intensity history and the angle history of the candidate object 54 or projectile 54A approaching the platform 12. The sensor 16 takes or obtains frames of data at a given rate and each of those frames has a source or candidate object 54 or projectile 54A that may be a threat. Notably, there may be other algorithms or techniques or other preprocessing methods that determine that the detected object 54 or projectile 54A is something that might be a threat or otherwise worth tracking or determining whether the platform is YATO/YANTO with respect to the candidate object 54 or projectile 54A. Spatial filters can be applied to the preprocessing techniques, if desired, so as to reduce processing power to only consider the candidate objects that would result in a threat to the platform.

With respect to the intensity history identified at step 302, once an object 54 or projectile 54A has been detected and it is being tracked, the sensor 16 associates each frame or the object 54 or projectile 54A within each frame with previous frames to associate a track of the moving object. The instructions provided by the system 10 and method 300 of the present disclosure have a data structure that keeps all the information about each of the detections associated with each other. One of the processes that the data structures may perform is to sum the intensity of the pixels that are the target pixels or the predicted target pixels. The instructions may be executed to perform image processing techniques to remove the background and leave only the energy that is coming from the target or candidate object that is being tracked. More particularly, the image processing techniques can subtract off or filter out the background and add up the number of counts in each pixel to obtain an intensity. The intensity history is maintained for the lifetime of the track. These list of intensities are utilized to be analyzed and curve fit the intensity history to determine whether the object 54 or projectile 54A is approaching or not approaching the platform 12. Objects or projectiles that are tracking towards the platform will have an intensity that increases over time.

With respect to angle history at step 302, the processor will know where the sensor 16 (and possible other sensors) are physically positioned on the platform and where a pixel on a focal plane is located. Therefore, the processor 18 can translate a detection location on the sensor 16 to an angle in space. Thus, each detection in each track will have an angle associated with it, or a pair of angles associated with it (azimuth and elevation). This pair of angles can be stabilized and account for movement of the platform 12. The angles can be stabilized in inertial space. These angles are recorded, via registration logic 26, to create an angle history of the candidate object 54 or projectile 54A in the track that removes or discounts motion of the platform.

As depicted in FIG. 3, a feature extraction technique, which is generally shown at 304, is applied. Feature extraction refers to obtaining the angle information and the intensity information obtained from the previous step 302, which may be lists of numbers, and deriving quantities that will be more easily ingested by the classifier or classification logic 24. For example, instead of providing the classifier one hundred or more intensity values, there may be a curve fit technique that is applied to the intensities and angles such that the coefficients of the curve fit are provided to the classifier or classification logic 24. For example, with respect to angle history, the classifier or classification logic 24 may be provided the total angle difference from start to end of the track, wherein a period of time is defined from the start to the end of the track. Essentially, the raw data from the track determined by sensor 16 extracts and derives more meaningful features from it. In one particular embodiment, the derivation of the more meaningful features performed at the feature extraction step 304 may be accomplished by the same processor 18 that is processing the intensity history and angle history. However, it is entirely possible for a separate processor to perform the feature extraction step 304. While it is envisioned that the derived features that were extracted during the feature extraction step 304 allow for a more efficient or more optimized performance of the classifier or classification logic 24, it is entirely possible for the raw data from step 302 to be provided to the classifier if the classifier was so trained on or to classify raw data in that format, yet more processing power would be required to accomplish it in this manner.

Data from the platform's other sensors may be accounted for as shown generally at 306. Accounting for data from other sensors on the platform that occurs at step 306 may be accomplished by logic or one or more processors that process the incoming data from the other sensors, such as: an inertial measurement unit (IMU); inertial navigations system (INS); global positioning system (GPS); an infrared photodiode; a Hall effect sensor; a pressure sensor; a polarized radio frequency antenna; an active optical receiver; accelerometers sensing accelerations experienced during rotation, translation, velocity/speed, location traveled, elevation gained; gyroscopes sensing movements during angular orientation and/or rotation, and rotation; altimeters sensing barometric pressure, altitude change, local pressure changes, submersion in liquid; impellers measuring the amount of air or fluid passing thereby; Electromyography sensors sensing electrical pulses; Audio Sensors sensing local environmental sound levels, voice detection; Photo/Light sensors sensing ambient light intensity, ambient Day/night, UV exposure; Temperature sensors sensing internal temperature, ambient air temperature, and environmental temperature; Moisture Sensors sensing surrounding moisture levels; radiofrequency (RF) sensors sensing wavelength propagating through a medium; and inductive sensors sensing inductive energy or capacitance.

Similarly, if available, data from an adjacent platform (for example, another aircraft flying in formation) may also be accounted for as shown at 308. Accounting for data from sensors on the adjacent platform that occurs at step 308 may be accomplished by logic or one or more processors that process the incoming data from the other sensors. The data that is accounted for at step 308 may generated from any type of sensor, such as those listed above or others.

Collectively, the extracted features from step 304, other sensor data from step 306, and other data from remote platforms at step 308, can be conditioned and normalized together, as shown generally at 310. In another embodiment, it is entirely possible for the feature extraction step 304 and the data conditioning and normalizing step 310 to be combined into a single process.

With continuous reference to FIG. 3, the data conditioning and normalization at step 310 refers to conditioning the data from different sources 304, 306, 308 into a format that provides a value that is on a same scale as the other pieces of data. For example, there is data coming from different sources, for example INS systems, GPS systems, a data link from the sister ship containing its position, and the extracted features from the image sensor 16 that results in the feature extraction 304 data. All of these data are very different types and can have different magnitudes. For example, the angle history of the object's track may be in radians but the other information may be in meters and it may be very large. In those cases, it is often advantageous to renormalize all of those numbers so that they are on a similar scale. The process can force each of these lists of numbers to a zero-to-one scale to help the classifier or classification logic 24 to weigh the relative importance of those features more evenly.

With respect to conditioning performed at step 310, there may be missing pieces of data from the sensors at any particular time. For example, there could be an instance where sensor may be slightly faulty such that a piece of information is not obtained at one specific time. The conditioning refers to the ability to extrapolate from a previous value in order to predict what the missing value was at that particular time that it was missing.

With continued reference to FIG. 3, the feature vector is obtained at step 312 subsequent to the data conditioning and normalization shown at 310. A feature vector obtained at step 312 is a list of data in a preferred or exact form that the classifier or classification logic 24 has been trained to receive. The feature vector is data that is used to perform an inference by the classifier, when the system 10 is operational, has to be in the exact form that the classifier was trained. Stated otherwise, the features should be in the correct order scaled and normalized properly, and be relatively complete so that the classifier, in one example, may classify a YATO/YANTO status of the platform 12 in response to the tracking of the candidate object 54 or a projectile 54A from object 54. The processor that performs the data conditioning and normalization may also be the same processor that was used for the feature extraction at step 304 and the tracking of data at step 302. However, it is entirely possible for a different processor to perform the data conditioning and normalization to generate the feature vector that will be used by the classifier or classification logic 24.

The feature vector 312 is a data stream or a set of information that has been put into a format that should provide appropriate input for the classifier to perform its classification. The exemplary feature vector can be a table of numbers, wherein the tables represent values associated with the platform speed, altitude, the starting angle, the ending angle, the starting intensity, and the ending intensity of the candidate object. One exemplary feature vector developed includes the following format: (for an image/image frame at each time) initial azimuth relative to tracked object, initial elevation relative to tracked object, change in azimuth relative to tracked object, change in elevation relative to tracked object, intensity curve fit coefficients, platform altitude, platform airspeed, and wingman/sister platform relative position.

The classifier or classification logic 24 used at step 314 can be one of different types of techniques that would work within the scope of the present disclosure so long as the classifier or classification logic 24 utilizes a machine learning technique to classify the feature vector identified at step 312 to result in an output classification of YATO/YANTO with respect to the platform 12. The classifier or classification logic 24 can be one of many types of artificial intelligence or machine learning techniques, such as a neural network, support vector machine, or any type of classifier that utilizes one or more decision trees. It has been determined that an R-tree type of machine learning techniques may be suitable for implementing the system and method of the present disclosure. This is because the feature vector obtained at step 312 is tabulated data and R-tree based machine learning techniques tend to work well with tabulated data. This is advantageous because the feature values of the tabulated data in the feature vector from step 312 can be different data such as an angle and an altitude and a length of time or the like, wherein R-tree based machine learning techniques tend to excel in their capabilities for implementing tabulate data that are different or contain different types of information. These decision tree based or R-tree based classifiers or classification logic 24 excel at utilizing these different types of information and producing a model that predicts new information very well. The classifier can be embodied as software code that is put into the processor 18 that is utilized to perform the other steps detailed herein.

As is common with artificial intelligence or machine learning classifiers, the classifier or classification logic 24 used at step 314 must be trained prior to effectuating or being able to complete the process and method detailed herein. With respect to training the decision tree based classifier, test data may be obtained from computer electric modeling (CEM) or from real world data collection. The test data, regardless of how the test data was obtained, may be placed into the appropriate format to obtain a test feature vector so that when actual operation of the method of the present disclosure is implemented, the manner in which the classifier was trained shall match the actual input data through the processor method detailed in FIG. 3.

During training of the classifier or classification logic 24, each test feature vector has a truth value associated with it, wherein the truth value is binary. For this machine learning process, the test feature vectors will either result in a truth that the test object is approaching the test platform or a falsity that the test object is not approaching the test platform. These test feature vectors are performed many times, sometimes hundreds of thousands or even millions of times, so that the classifier or classification logic 24 has a sufficient amount of test data that it can evaluate and be able to appropriately compare when implemented in real world applications.

In operation and with continued reference to the flowchart of FIG. 3, the feature vector from step 312 is provided to the classifier at step 314, which results in a decision or classification of either YATO or YANTO with respect to the candidate object and the platform, which is generally shown at step 316. Essentially, step 316 is the result and output of the classifier as to whether "you are the one" or "you are not the one" that the candidate object or projectile 54A from the object is moving towards. In a broader sense, the classification as to whether "you are the one" or "you are not the one" that the candidate object or projectile 54A from the object is moving towards is a binary classification (e.g., 0 equals "you are not the one" and 1 equals "you are the one"). Thus, step 316 may result in a binary output that reflects the determination of whether "you are the one" or "you are not the one" that the candidate object or projectile 54A from the object is moving towards.

Subsequent to the decision of whether the classifier has determined YATO/YANTO, this information may be fed to a downstream or subsequent device, such as a threat warning system, which is generally indicated at step 318. For example, if the classifier from step 314 determines at step 316 that the platform is, in fact, YATO, then the YATO classification output may be provided at step 318 to a downstream destination or subsequent device, such as a threat warning system on the platform 12 so as to enable the platform 12 to take evasive measures or deploy a countermeasure. The YATO/YANTO determination may be provided in the form of instructions for the platform to perform an evasive technique (i.e., steer the platform in a different direction) or deploying a countermeasure, such as a hard-kill countermeasure or a soft-kill countermeasure. Wherein a hard-kill countermeasure refers to a munition or the like that destroys the incoming object and a soft-kill countermeasure refers to a technique, normally achieved with optical or thermal properties, that disrupts the object from achieving its objective by guiding the object off-track and away from the platform.

The alternative embodiment is shown in FIG. 4 that indicates the continuous track data at step 402 is obtained in parallel with the platform data at step 406 and with the sister platforms data, if available, at step 408. Together, this information is provided to a combined feature extraction process, which performs data conditioning and normalization of the data from these three streams of information simultaneously with the extraction of those features at step 404/410. The feature vector may then be created as indicated at 412. From the feature vector the classifier and the remaining balance of method 400, shown as 414, 416, 418, may operate similar to that which was described at 314, 316, and 318, respectively.

Some commercial applications of the present disclosure could work with a stationary platform detecting objects that are incoming towards the platform to make the ultimate determination of whether the platform is the one (YATO-you are the one; or YANTO-you are not the one). For example, a commercial cell tower or any other non-moving structure having non-military applications could utilize the imagery obtained from a sensor mounter on the cell tower to make a determination whether the cell tower is YATO/YANTO with respect to an object moving towards the cell tower.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A computer program product including at least one non-transitory computer readable storage medium having instructions encoded thereon that, when executed by one or more processors, implement a process track an object, the process comprising:

tracking a moving object via at least one passive sensor on at least one platform;

obtaining temporal data and angular data of the object relative to the platform via the passive sensor;

tabulating the temporal data and angular data of the object over a period of time;
extracting features from the temporal data and angular data of the object;
generating a feature vector from the features that were extracted;
providing the feature vector to a machine learned classifier; and
determining, via the machine learned classifier analyzing the feature vector, whether the object is moving toward the platform and considered You Are The One (YATO) or if not moving toward the platform and considered You Are Not The One (YANTO).

2. The computer program product of claim 1, wherein tabulating the temporal data and angular data occurs continuously over the period of time.

3. The computer program product of claim 1, further comprising:
associating the object in an image with previous image frames to generate a track of the object.

4. The computer program product of claim 3, further comprising:
summing intensities of a plurality of pixels from a focal plane array on the at least one passive sensor, wherein the plurality of pixels have sensed the object during the previous image frames.

5. The computer program product of claim 4, further comprising:
maintaining summed intensities of the pixels for a period of time for the track.

6. The computer program product of claim 3, further comprising:
filtering the image to remove the background data relative to object in the image.

7. The computer program product of claim 1, further comprising:
curve fitting the features extracted from the temporal data and angular data of the object.

8. The computer program product of claim 7, further comprising:
deriving a set of derived data from curve fit extracted features of the temporal data and angular data.

9. The computer program product of claim 1, further comprising:
accounting for data from other sensors on the platform; and
accounting for data from a remote platform; and
conditioning and normalizing the data accounted for from other sensors on the platform and the data accounted for from the remote platform with the features extracted from the temporal data and angular data of the object.

10. The computer program product of claim 1, further comprising:
generating the feature vector in a format in which the classifier has been trained.

11. The computer program product of claim 1, further comprising:
generating the feature vector to provide data representing initial azimuth relative to the object, initial elevation relative to the object, change in azimuth relative to the object, change in elevation relative to the object, intensity curve fit coefficients, platform altitude, and platform airspeed.

12. The computer program product of claim 1, wherein the machine learned classifier utilizes an R-tree decision process.

13. The computer program product of claim 1, wherein the machine learned classifier is trained prior to being provided with the feature vector.

14. The computer program product of claim 1, further comprising:
providing a YATO/YANTO determination to a subsequent device or logic that makes a subsequent determination of how to utilize the YATO/YANTO determination.

15. An object classification system comprising:
a platform;
a passive sensor carried by the platform, wherein the passive sensor is configured to track a moving object;
temporal data logic configured to process temporal data associated with the moving object;
spatial data logic configured to process spatial data associated with the moving object; and
classification logic including a trained machine learned classifier to classify, based on the temporal data and the spatial data, whether the moving object is moving toward the platform and considered You Are The One (YATO) or if not moving toward the platform and considered You Are Not The One (YANTO), and instructions for the platform to perform an evasive technique or deploy a countermeasure in response to the trained machine learned classifier having classified the moving object as moving toward the platform and the platform considered YATO.

16. The system of claim 15, further comprising:
logic to tabulate the temporal data and angular data of the moving object over a period of time.

17. The system of claim 16, further comprising:
logic to extract features from the tabulated temporal data and angular data of the moving object.

18. The system of claim 17, further comprising:
logic to generate a feature vector from the features that were extracted.

19. The system of claim 18, wherein the feature vector includes initial azimuth relative to the moving object, initial elevation relative to the moving object, change in azimuth relative to the moving object, change in elevation relative to the moving object, intensity curve fit coefficients, platform altitude, and platform airspeed.

* * * * *